United States Patent
Kimura et al.

(10) Patent No.: US 11,120,527 B2
(45) Date of Patent: Sep. 14, 2021

(54) VEHICULAR CAMERA AND CAMERA SYSTEM

(71) Applicant: DENSO CORPORATION, Kariya (JP)

(72) Inventors: Takayuki Kimura, Kariya (JP);
Toshikazu Murao, Kariya (JP);
Yuzuru Koshisaka, Kariya (JP);
Tetsuya Kimata, Kariya (JP)

(73) Assignee: DENSO CORPORATION, Kariya (JP)

(*) Notice: Subject to any disclaimer, the term of this patent is extended or adjusted under 35 U.S.C. 154(b) by 171 days.

(21) Appl. No.: 16/416,562

(22) Filed: May 20, 2019

(65) Prior Publication Data
US 2019/0355100 A1 Nov. 21, 2019

(30) Foreign Application Priority Data
May 18, 2018 (JP) .............................. JP2018-096484

(51) Int. Cl.
*G06T 5/00* (2006.01)
*H04N 5/225* (2006.01)
*G06K 9/00* (2006.01)
*G06T 7/70* (2017.01)
*G06T 3/40* (2006.01)

(52) U.S. Cl.
CPC .......... *G06T 5/003* (2013.01); *G06K 9/00791* (2013.01); *G06T 3/4038* (2013.01); *G06T 7/70* (2017.01); *H04N 5/2253* (2013.01); *G06T 2200/32* (2013.01); *G06T 2207/30248* (2013.01)

(58) Field of Classification Search
CPC ......... H04L 43/08; H04L 67/22; G09F 21/04; A01K 2217/075; B60R 21/01538
See application file for complete search history.

(56) References Cited

U.S. PATENT DOCUMENTS

| | | | |
|---|---|---|---|
| 6,389,340 B1 | 5/2002 | Rayner | |
| 7,218,758 B2* | 5/2007 | Ishii | .......................... B60R 1/00 340/933 |
| 7,421,095 B2* | 9/2008 | Ikeda | .......................... G06T 7/12 348/119 |
| 7,808,327 B2* | 10/2010 | Feygin | .................... H03L 1/026 331/46 |
| 7,899,213 B2* | 3/2011 | Otsuka | .................. G01M 11/068 382/104 |

(Continued)

FOREIGN PATENT DOCUMENTS

JP 2011232858 A 11/2011
JP 2013157946 A 8/2013

*Primary Examiner* — Yosef Kassa
(74) *Attorney, Agent, or Firm* — Maschoff Brennan

(57) ABSTRACT

In a vehicular camera, an image generation unit generates at least one image of a directional view from a vehicle, and an object recognition unit recognizes a target object in the at least one image. A region identification unit identifies, in the at least one image, a specific region in the target object recognized by the object recognition unit. A vehicle control unit performs a vehicle control task based on the recognized target object. A mosaic unit identifies a specific region in the at least one image corresponding to the specific region in the at least one image, and performs a mosaic task to thereby blur a mosaic region in the second image. The mosaic region includes at least the specific region in the at least one image.

14 Claims, 7 Drawing Sheets

(56) References Cited

U.S. PATENT DOCUMENTS

| | | | |
|---|---|---|---|
| 8,711,485 B2 * | 4/2014 | Schliep | G02B 27/0172 359/630 |
| 8,754,760 B2 * | 6/2014 | Augst | B60R 1/00 340/435 |
| 8,958,662 B1 * | 2/2015 | Grosz | H04N 21/854 382/305 |
| 8,977,007 B1 * | 3/2015 | Ferguson | G06K 9/00825 382/104 |
| 9,432,575 B2 * | 8/2016 | Kuchiki | H04N 5/23232 |
| 9,946,937 B2 * | 4/2018 | Faber | G06K 9/00825 |

* cited by examiner

VEHICULAR CAMERA AND CAMERA SYSTEM

CROSS REFERENCE TO RELATED APPLICATION

This application is based on and claims the benefit of priority from Japanese Patent Application No. 2018-96484 filed on May 18, 2018, the disclosure of which is incorporated in their entireties herein by reference.

TECHNICAL FIELD

The present disclosure relates to vehicular cameras and camera systems each including such a vehicular camera.

BACKGROUND

Drive recorders are each installable in a vehicle. Such a drive recorder, which is installed in a vehicle, causes a camera to capture images of respective views from the vehicle, and records the captured images therein.

SUMMARY

The present disclosure provides a vehicular camera.

In the vehicular camera, a region identification unit identifies, in at least one image, a specific region in a target object recognized by an object recognition unit. A vehicle control unit performs a vehicle control task based on the recognized target object. A mosaic unit identifies a specific region in the at least one image corresponding to the specific region in the at least one image, and performs a mosaic task to thereby blur a mosaic region in the at least one image, the mosaic region including at least the specific region in the at least one image.

BRIEF DESCRIPTION OF THE DRAWINGS

Other aspects of the present disclosure will become apparent from the following description of embodiments with reference to the accompanying drawings in which.

DESCRIPTION OF THE EMBODIMENT

Inventor's Viewpoint

Figure 1:
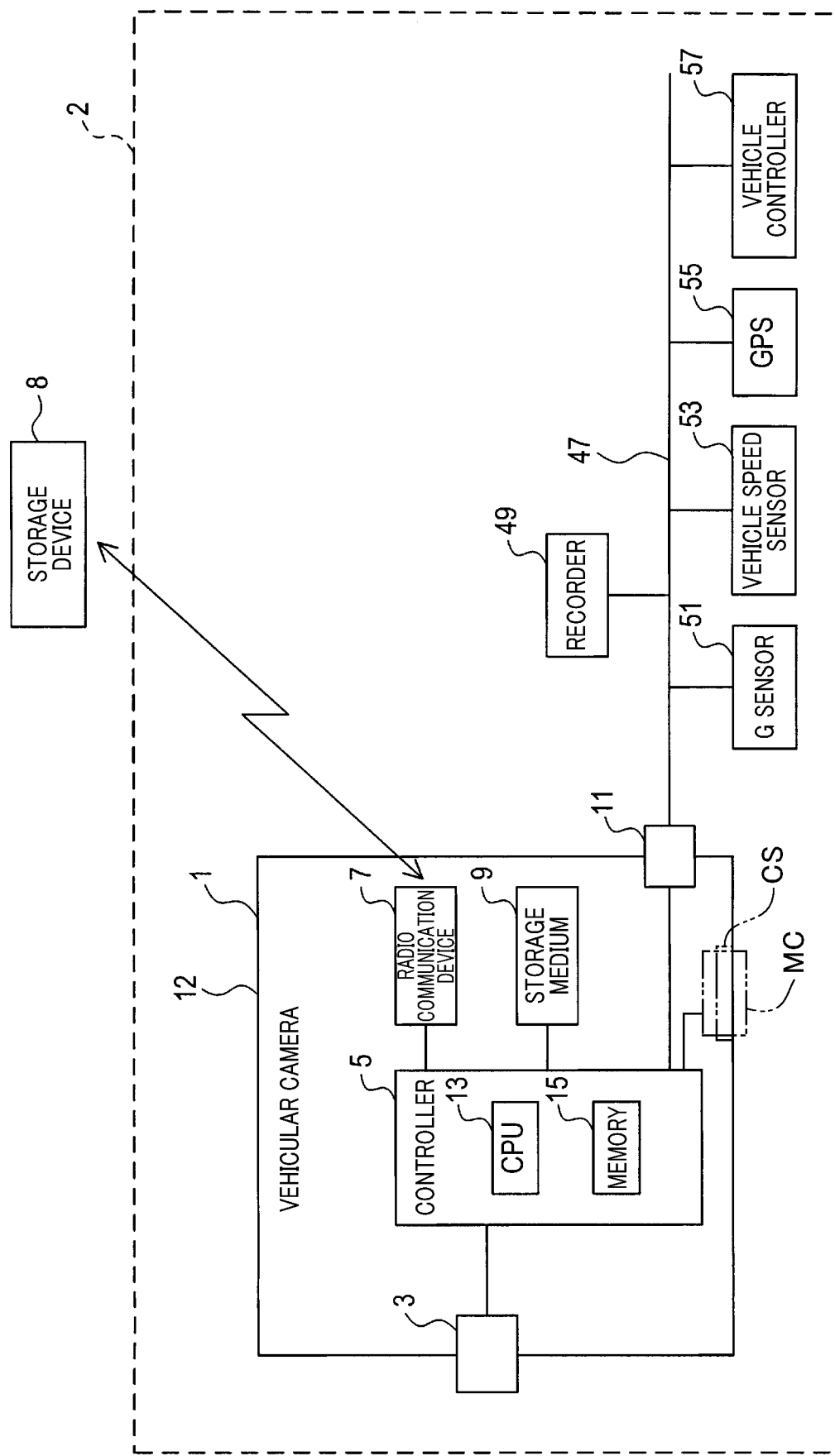
FIG. 1 is a block diagram schematically illustrating an example of the structure of a vehicular camera according to an exemplary embodiment of the present disclosure.

Drive recorders are each installable in a vehicle. Such a drive recorder, which is installed in a vehicle, causes a camera to capture images of respective views from the vehicle, and records the captured images therein. Vehicular cameras are installable in a vehicle. Such a vehicular camera, which is installed in a vehicle, also captures images of respective views from the vehicle. The images captured by the vehicular camera can be used for controlling and/or assisting driving operations of the vehicle.

Directly using images recorded in such a drive recorder may cause privacy issues. Installing a camera of such a drive recorder and such a vehicular camera in a vehicle may reduce an installable space of the vehicle.

From these viewpoints, the present disclosure seeks to provide vehicular cameras, each of which is capable of maintaining user privacy while reducing a required installation space.

A vehicular camera according to an exemplary aspect of the present disclosure includes an image generation unit configured to generate first and second images of a directional view from a vehicle, and an object recognition unit configured to recognize a target object in the first image. The vehicular camera includes a region identification unit configured to identify, in the first image, a specific region in the target object recognized by the object recognition unit. The vehicular camera includes a vehicle control unit configured to perform a vehicle control task based on the recognized target object. The vehicular camera includes a mosaic unit configured to identify a specific region in the second image corresponding to the specific region in the first image, and perform a mosaic task to thereby blur a mosaic region in the second image, the mosaic region including at least the specific region in the second image.

The vehicular camera according to the exemplary aspect is configured to generate the second image, and is configured to perform, based on the first image, the vehicle control task. This configuration of the vehicular camera eliminates the need to install a drive recorder camera in the vehicle in addition to the vehicular camera 1, making it possible to save an installable space in the vehicle.

The vehicular camera is also configured to perform the mosaic task to thereby blur, in the second image, the specific region in the second image. This configuration protects the privacy of information represented by the specific region in the second image.

EMBODIMENT

The following describes an exemplary embodiment of the present disclosure with reference to the accompanying drawings. In the exemplary embodiment and its modifications, like reference characters are assigned to like or identical parts between the exemplary embodiment and its modifications, so that the descriptions for one of the like or identical parts are applied to another of the like or identical parts.

Figure 2:
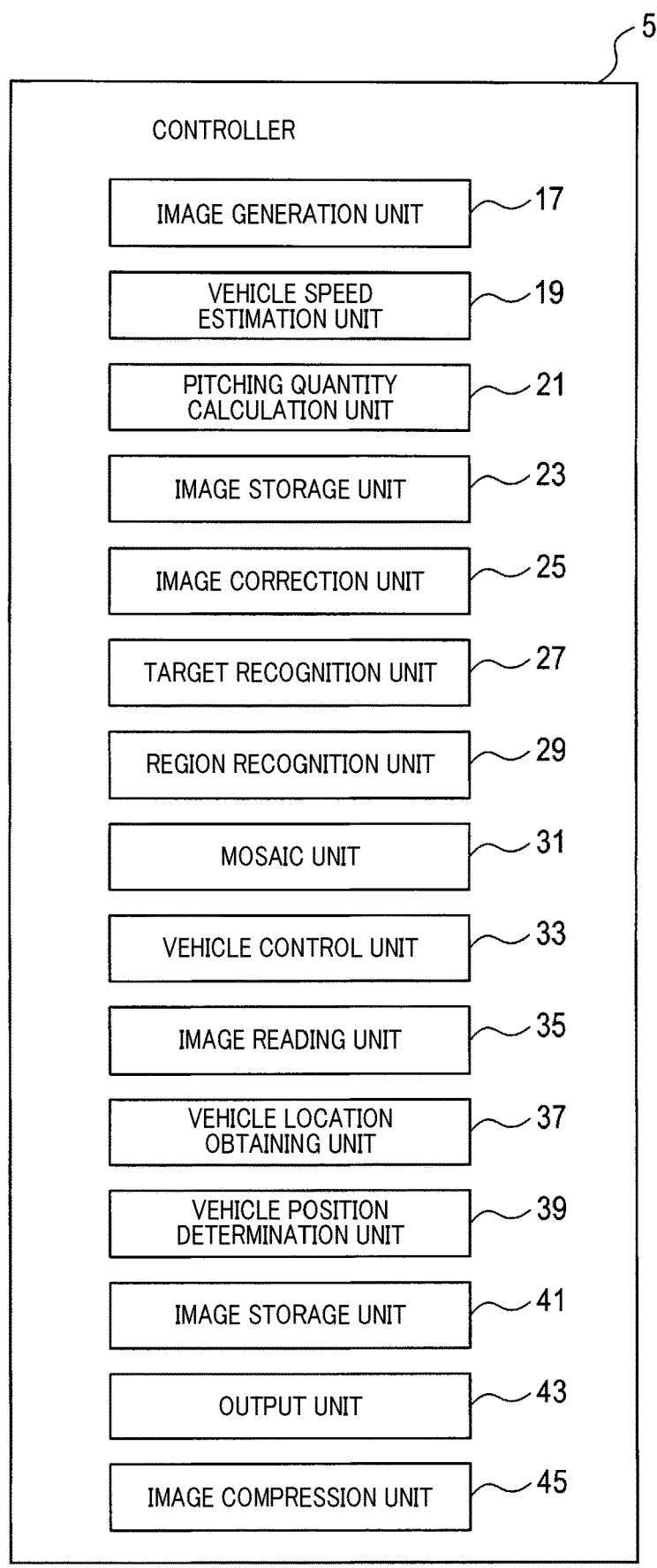
FIG. 2 is a block diagram schematically illustrating an example of the functional structure of a controller illustrated in FIG. 1.
Figure 3:
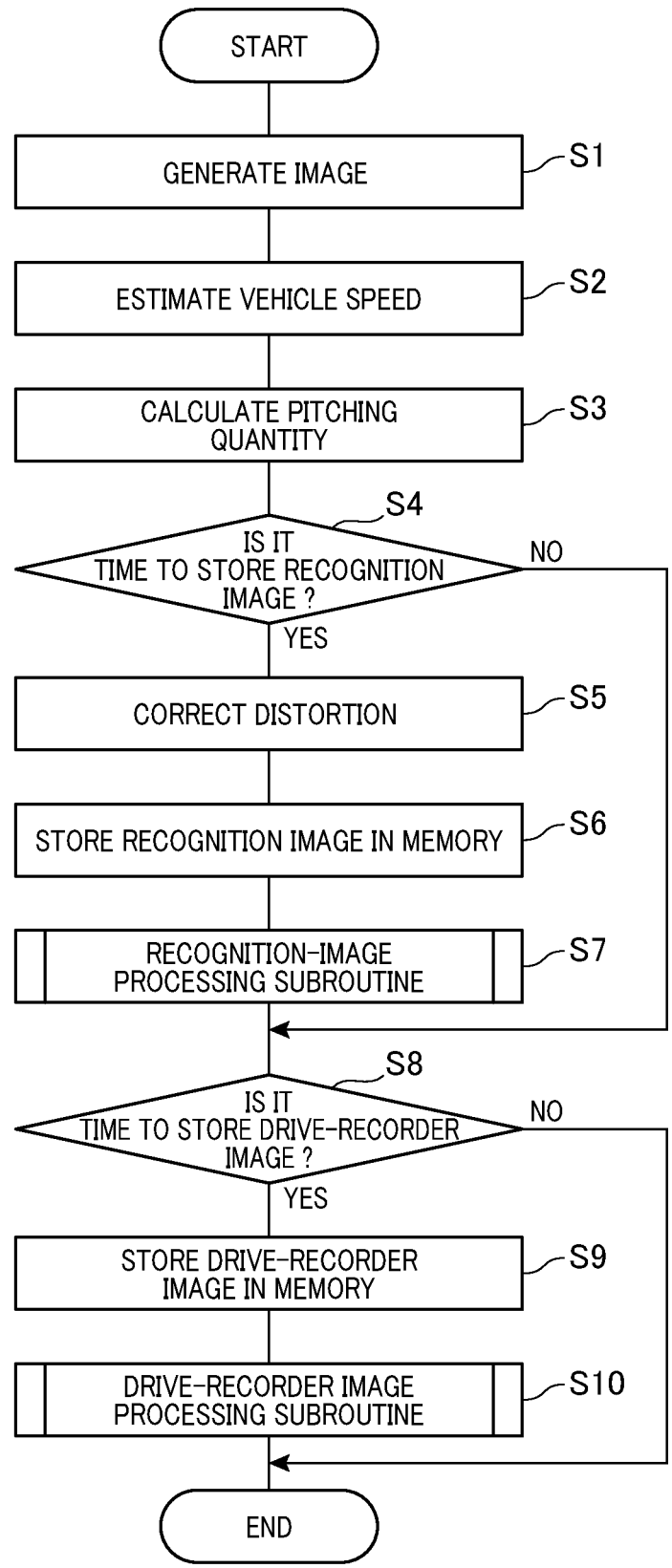
FIG. 3 is a flowchart schematically illustrating an example of an image processing routine carried out by the controller.

The following describes the structure of a vehicular camera 1 according to the exemplary embodiment of the present disclosure with reference to FIGS. 1 and 2. The vehicular camera 1, which is designed as a monocular camera or a stereo camera, is installed to a vehicle 2.

Referring to FIG. 1, the vehicular camera 1 includes, for example, an imaging unit 3, a controller 5, a radio communication device 7, a storage medium 9, an input/output (I/O) interface 11, and a housing 12.

The imaging unit 3, radio communication device 7, storage medium 9, and I/O interface 11 are communicably connected to the controller 5.

The imaging unit 3 is comprised of an imager 3a and a lens system 3b.

The imager 3a is comprised of a plurality of light receiving elements, which respectively correspond to a plurality of pixels, two-dimensionally arranged in both vertical and horizontal directions corresponding to the respective height direction and width direction of the vehicle 2. The two-dimensionally arranged pixels constitute a light receiving surface of the imager 3a.

The lens system 3b is configured to focus light incident from, for example, a region in front of the vehicle 2 on the light receiving surface of the imager 3a; the region in front of the vehicle 2 corresponds to, for example, a view from the vehicle 2.

The imager 3a is configured to receive light focused on the light receiving surface thereof during a controllable shutter time, i.e. an exposure duration, so that each of the two-dimensionally arranged light-sensitive elements (pixels) receives a corresponding light component under control of the controller 5.

Then, the imager 3a converts, using each of the light receiving elements, a corresponding received light component into an electrical charge, i.e. an electrical signal, corresponding to the intensity of the received light component, thus outputting the electric signals as received light data, i.e. one frame image showing a front image of the vehicle 2. That is, the imager 3a is configured to cyclically perform a light reception operation to thereby obtain one frame image comprised of, for each pixel, the intensity of the corresponding received light component.

The controller 5 is constructed mainly by a computer including a central processing unit (CPU) 13 and a memory 15 including at least one of storage media including a RAM and a ROM. The CPU 13 is communicably connected to the memory 15.

At least part of all functions provided by the controller 5 can be implemented by at least one processor; the at least one processor can be comprised of (1) The combination of at least one programmable processing unit, i.e. at least one programmable logic circuit, and at least one memory (2) At least one hardwired logic circuit (3) At least one hardwired-logic and programmable-logic hybrid circuit Specifically, the controller 5 is configured such that the CPU 13 performs instructions of programs stored in the memory 15, thus performing predetermined software tasks; at least some of the software tasks implement the following functional components of the controller 5. The controller 5 can also be configured such that the at least one special-purpose electronic circuit performs predetermined hardware tasks; at least some of the hardware tasks implement the following functional components of the controller 5. The controller 5 can be configured to perform both software tasks and hardware tasks; at least some of the software and hardware tasks implement the following functional components of the controller 5.

Referring to FIG. 2, the controller 5, i.e. the CPU 13, functionally includes an image generation unit 17, a vehicle speed estimation unit 19, a pitch quantity calculation unit 21, an image storage unit 23, an image correction unit 25, a target recognition unit 27, and a region recognition unit 29.

The controller 5, i.e. the CPU 13, also functionally includes a pixelization unit, i.e. a mosaic unit, 31, a vehicle control unit 33, an image reading unit 35, a vehicle location obtaining unit 37, a vehicle position determination unit 39, an image storage unit 41, an output unit 43, and an image compression unit 45.

The radio communication device 7 is capable of performing radio communications with a storage device 8 located outside the vehicle 2. The storage device 8 is capable of storing various items of information, such as images. The radio communication device 7 and storage device 8 are capable of performing radio communications therebetween using, for example, a Wi-Fi® network, a Bluetooth® network, or another similar radio network. A storage terminal wearable by a user can be used as the storage device 8.

The output port 11 enables, in accordance with a predetermined interface, communicable connections between the controller 5 of the vehicular camera 1 and a vehicular network 47 established in the vehicle 2. A Universal Serial Bus (USB) interface, A Low voltage differential signaling (LVDS) interface, an Ethernet® interface, or another similar interface can be used as the interface of the output port 11.

The housing 12 is configured to house the imaging unit 3, the controller 5, the radio communication device 7, and the storage medium 9. The output port 11 is attached to the housing 12. The housing 12 is arranged in the vehicle 2 such that the imaging unit 3 is able to capture images of the front view from the vehicle 2.

The vehicle 2 includes the vehicular network 47, a recorder 49, a G sensor 51, a vehicle speed sensor 53, a global positioning system (GPS) receiver 55, and a vehicular controller 57 in addition to the vehicular camera 1; these components 49, 51, 53, 55, and 57 are communicably connected to the vehicular network 47. The recorder 49 serves as, for example, an external device from the vehicular camera 1.

That is, the vehicular network 47 provides communicable connections between the vehicular camera 1 and the components 49, 51, 53, 55, and 57.

The recorder 49 is configured to store drive-recorder images described in detail below.

The G sensor 51, which serves as an accelerator sensor, is configured to measure values of acceleration about respective pitch axis, roll axis, and yaw axis of the vehicle 2. These pitch, roll, and yaw axes pass through the center of gravity of the vehicle 2. The pitch axis represents a horizontal axis parallel to the width direction of the vehicle 2, so that a pitch angle of the vehicle 2 represents a rotational angle of the vehicle 2 about the pitch axis. The yaw axis represents a vertical axis parallel to the height direction of the vehicle 2, so that a yaw angle of the vehicle 2 represents a rotational angle of the vehicle 2 about the yaw axis. The roll axis represents a longitudinal axis parallel to the longitudinal direction of the vehicle 2, so that a roll angle of the vehicle 2 represents a rotational angle of the vehicle 2 about the roll axis.

Then, the G sensor 51 sends measurement signals respectively indicative of the values of acceleration about the respective pitch axis, roll axis, and yaw axis of the vehicle 2 to the controller 5 of the vehicular camera 1.

The vehicle speed sensor 53 is configured to measure the speed of the vehicle 2, and send a measurement signal indicative of the speed of the vehicle 2, which will be referred to as a vehicle speed V, to the controller 5. The GPS receiver 55 is configured to receive global positioning system (GPS) signals, which are sent from GPS satellites, to thereby calculate the latitude and longitude of the current position of the vehicle 2 based on the received GPS signals. Then, the GPS receiver 55 is configured to send, to the controller 5, a measurement signal indicative of the latitude and longitude of the current position of the vehicle 2.

The vehicle controller 57 is configured to perform vehicle control tasks for example including 1. A task of decelerating the vehicle 2 using a deceleration device installed in the vehicle 2

2. A task of stopping the vehicle 2 using the deceleration device

3. A task of accelerating the vehicle 2 using an acceleration device installed in the vehicle 2

3. A task of steering the vehicle 2 using a steering mechanism installed in the vehicle 2

4. A task of outputting, from a warning device, visible and/or audible warning information to a driver of the vehicle 2

Next, the following describes an image processing routine carried out by the controller 5 every predetermined period with reference to FIGS. 3 to 7. One image processing routine periodically performed by the controller 5 will be referred to as a cycle.

When starting a current cycle of the image processing routine, the controller 5 serves as the image generation unit 17 to cause the imaging unit 3 to capture, i.e. generate, a frame image of, for example, the front view from the vehicle 2 at a corresponding date and time in step S1. Note that the controller 5 according to the exemplary embodiment is configured to cause the imaging unit 3 to successively capture frame images in accordance with a predetermined value of the exposure duration, i.e. shutter time, and a predetermined value of a frame rate. For example, the controller 5 sets the exposure duration to a value selected from the range from 1 to 100 μs, and sets the frame rate to a value selected from the range from 10 to 60 frame per seconds (fps).

For example, the controller 5 is programmed to perform a cycle of the image processing routine each time the imaging unit 3 captures a frame image in accordance with the frame rate.

In step S2, the controller 5 serves as the vehicle speed estimation unit 19 to estimate, based on the measurement signal sent from the vehicle speed sensor 53, the vehicle speed V at the timing when the frame image is captured in step S1.

Next, the controller 5 serves as the pitching calculation unit 21 to calculate, based on the measurement signal sent from the G sensor 51, a pitch quantity of the vehicle 2 at the timing when the frame image is captured in step S1.

Subsequently, the controller 5 serves as the image storage unit 23 to determines whether it is time to store a recognition image in the memory 15 in step S4. Note that the recognition image is a frame image generated in step S1 of the current cycle of the image processing routine and used for a recognition-image processing subroutine described later.

For example, the controller 5 serves as the image storage unit 23 to determine whether a predetermined time interval T1 has elapsed since the recognition image was stored at the last time in the memory 15.

When it is determined that the predetermined time interval T1 has elapsed since the recognition image was stored at the last time in the memory 15 (YES in step S4), the image processing routine proceeds to step S5. Otherwise, when it is determined that the predetermined time interval T1 has not elapsed since the recognition image was stored at the last time in the memory 15 (NO in step S4), the image processing routine proceeds to step S8.

In step S5, the controller 5 serves as the image correction unit 25 to perform correction for the frame image generated in step S1 of the current cycle of the image processing routine to thereby reduce a distortion of the frame image due to a lens distortion contained in the frame image. Note that the lens distortion represents a distortion of the lens system 3b. The memory 15 of the controller 5 according to the exemplary embodiment stores distortion correction information about the lens distortion, and the controller 5 is configured to perform the correction for the frame image based on the distortion correction information to accordingly reduce the distortion of the frame image.

Subsequently, the controller 5 serves as the image storage unit 23 to

1. Determine that the frame image corrected in step S5 of the current cycle of the image processing routine is the recognition image 2. Store the recognition image, the vehicle speed estimated in step S2, the pitch quantity calculated in step S3, and the corresponding date and time in the memory 15 such that the vehicle speed, the pitch quantity, and the corresponding date and time correlate with the recognition image in step S6.

Next, the controller 5 performs a recognition-image processing subroutine in step S7.

Figure 4:
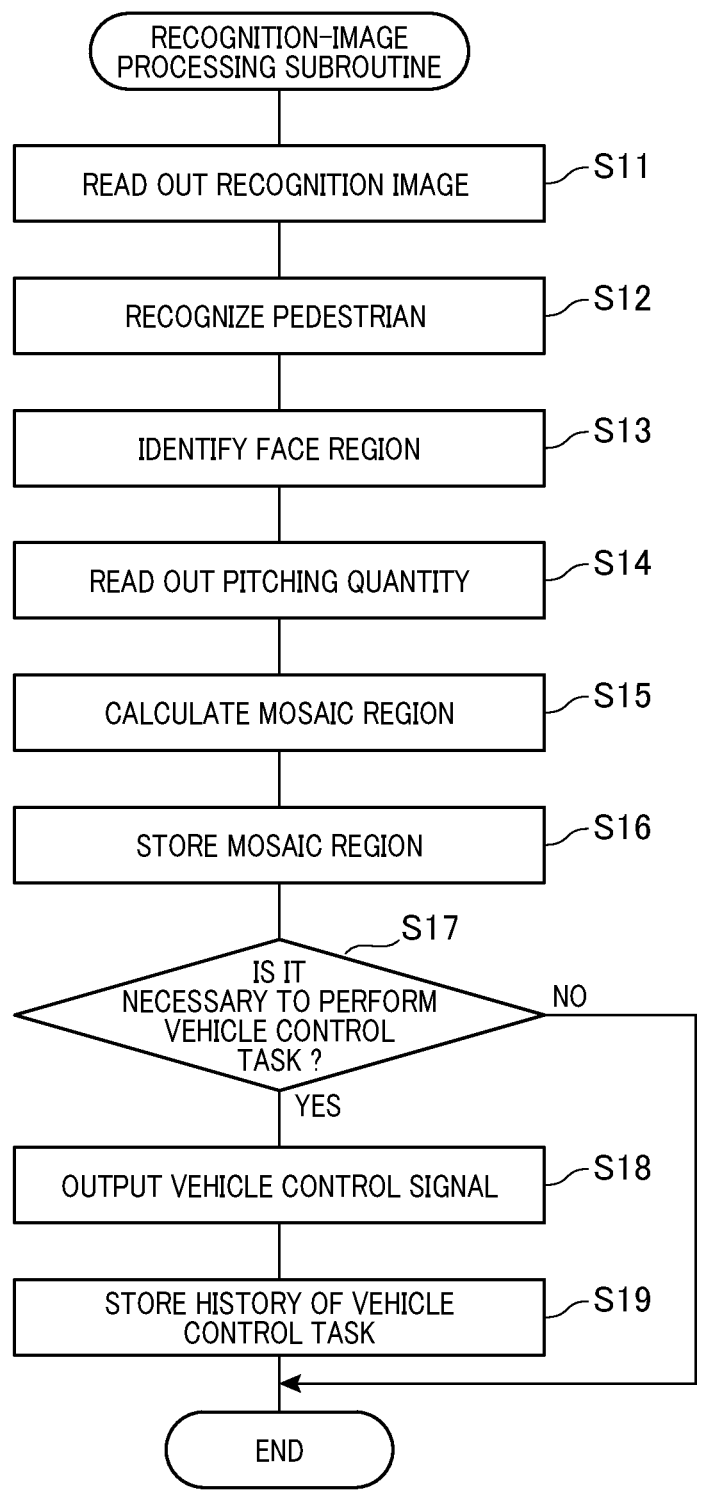
FIG. 4 is a flowchart schematically illustrating an example of a recognition-image processing subroutine included in the image processing routine.

The following describes the recognition-image processing subroutine in step S7 with reference to FIG. 4.

When starting the recognition-image processing subroutine, the controller 5 serves as the image readout unit 35 to read out, from the memory 15, the recognition image stored in immediately previous step S6 of the current cycle of the image processing routine in step S11.

Figure 6:
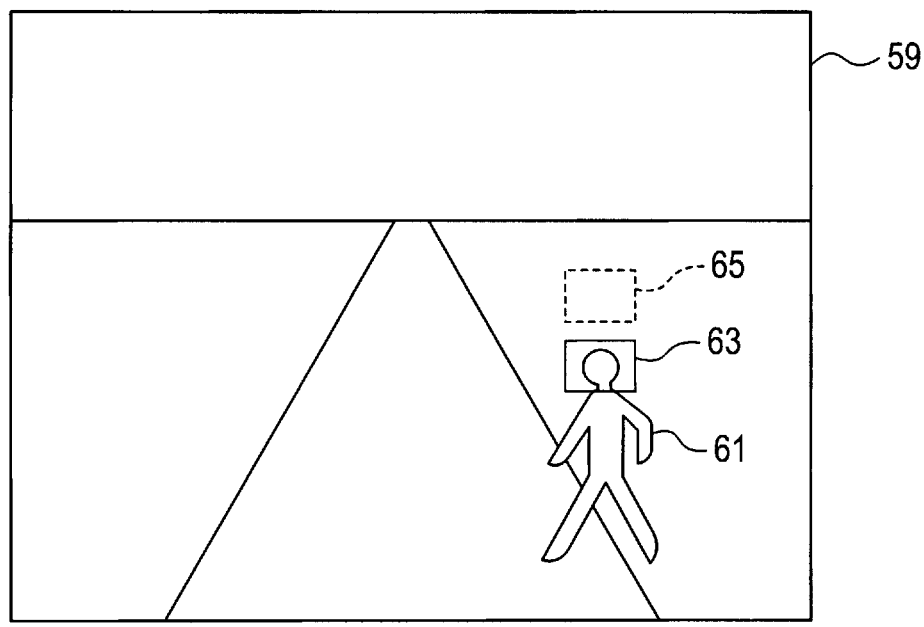
FIG. 6 is a view schematically illustrating an example of a recognition image in which a pedestrian is included according to the exemplary embodiment.

Next, the controller 5 serves as the object recognition unit 27 to recognize, in the readout recognition image, at least one pedestrian as a target object to be recognized in accordance with known image recognition technologies when the at least one pedestrian is contained in the readout recognition image in step S12. For example, FIG. 6 illustrates an example of the recognition image using reference numeral 59, and a pedestrian included in the recognition image using reference numeral 61. The controller 5 serves as the object recognition unit 27 to recognize the pedestrian 61 in the recognition image 59.

Following the operation in step S12, the controller 5 serves as the region identification unit 29 to recognize, i.e. identify, a region of the face of the recognized pedestrian in the recognition image; the region of the face of the recognized pedestrian contains the face of the recognized pedestrian in step S13. The region of the face, which will be referred to as a face region, of the recognized pedestrian represents a specific region in a recognized target object. For example, the controller 5 serves as the region identification unit 29 to identify a face region 63 of the recognized pedestrian 61 in the recognition image (see FIG. 6).

Next, the controller 5 serves as the mosaic unit 31 to read out, from the memory 15, the pitch quantity correlating with the recognition image read out in step S11 in step S14.

Then, the controller 5 serves as the mosaic unit 31 to correct, in the recognition image, the position of the face region of the recognized pedestrian based on the pitch quantity read out in step S14 in step S15.

Specifically, the mosaic unit 31 corrects the position of the face region of the recognized pedestrian to a position thereof obtained when the pitch quantity is zero. The mosaic unit 31 also defines the corrected face region as a mosaic region. For example, the mosaic unit 31 corrects the position of the face region 63 to a position 65 as a mosaic region 65.

Next, the controller 5 serves as the mosaic unit 31 to obtain, in the recognition image, information indicative of the position, size, and shape of the mosaic region obtained in step S15 as mosaic information in step S16. Then, the controller 5 serves as the mosaic unit 31 to store the mosaic information in the memory 15 so as to correlate with the recognition image used in step S15. For example, an address is assigned to the location of each of the pixels of the recognition image, and the position of the mosaic region includes addresses of selected pixels in the mosaic region, and the size of the mosaic region represents an area of the mosaic region or the number of pixels contained in the mosaic region.

Subsequently, the controller 5 serves as the vehicle control unit 33 to determine whether the controller 5 needs to perform at least one of the vehicle control tasks based on the at least one pedestrian recognized in step S12 in step S17.

For example, the vehicle control unit 33 calculates a minimum distance between the at least one pedestrian located in front of the vehicle 2 and the vehicle 2 based on, for example, the positional relationship between the vehicle 2 and the at least one pedestrian in the recognition image obtained in the current cycle of the image processing routine, the stored recognition images, and/or another known distance measurement procedure in step S17.

Then, the vehicle control unit 33 determines whether the measured minimum distance is equal to or less than a predetermined threshold distance in step S17.

When it is determined that the measured minimum distance is equal to or less than the predetermined threshold distance, the vehicle control unit 33 determines that the vehicle control unit 33 needs to perform at least one of the vehicle control tasks (YES in step S17). Otherwise, when it is determined that the measured minimum distance is more than the predetermined threshold distance, the vehicle control unit 33 determines that the vehicle control unit 33 need not perform the at least one of the vehicle control tasks (NO in step S17).

The image processing subroutine proceeds to step S18 upon it being determined that the vehicle control unit 33 needs to perform at least one of the vehicle control task (YES in step S18). Otherwise, the controller 5 returns to the operation in step S8 of the main image processing routine upon it being determined that the vehicle control unit 33 does not need to perform at least one of the vehicle control tasks.

In step S18, the controller 5 serves as the vehicle control unit 33 to output, to the vehicle controller 57, one or more vehicle control signals; the vehicle control signals for example include (1) The vehicle control signal that instructs the vehicle controller 57 to decelerate the vehicle 2 using the deceleration device (2) The vehicle control signal that instructs the vehicle controller 57 to stop the vehicle 2 using the deceleration device (3) The vehicle control signal that instructs the vehicle controller 57 to steer, using the steering mechanism, the vehicle 2 toward a selected direction to avoid the at least one pedestrian (4) The vehicle control signal that instructs the vehicle controller 57 to cause the warning device to visibly and/or audibly output warning information Following the operation in step S18, the controller 5 serves as the vehicle control unit 33 to store, in the memory 15, a history of the outputting of the vehicle control signal in step S19, and returns to the operation in step S8 of the main image processing routine.

In step S8 of the main image processing routine, the controller 5 serves as the image storage unit 23 to determine whether it is time to store a drive recorder image in the memory 15. Note that the drive recorder image is a frame image generated in step S1 of the current cycle of the image processing routine for recording drive of the vehicle 2, and used for a recorder-image processing subroutine described later.

For example, the controller 5 serves as the image storage unit 23 to determine whether a predetermined time interval T2 has elapsed since the drive recorder image was stored at the last time in the memory 15. The predetermined time interval T2 is set to be larger than the predetermined time interval T1.

When it is determined that the predetermined time interval T2 has elapsed since the drive recorder image was stored at the last time in the memory 15 (YES in step S8), the image processing routine proceeds to step S9. Otherwise, when it is determined that the predetermined time interval T2 has not elapsed since the drive recorder image was stored at the last time in the memory 15 (NO in step S8), the controller 5 terminates the current cycle of the image processing routine.

In step S9, the controller 5 serves as the image storage unit 23 to

1. Determine that the frame image generated in step S1 of the current cycle of the image processing routine as the drive recorder image 2. Store the drive recorder image and the corresponding date and time in the memory 15 such that the corresponding date and time correlates with the drive recorder image in step S9.

Note that at least a part of the frame images generated in step S1 can serves as both the recognition image and the drive record image. Additionally, any frame image generated in step S1 can serve as one of the recognition image and the driver recorder image.

Next, the controller 5 performs a drive-recorder image processing subroutine in step S7.

Figure 5:
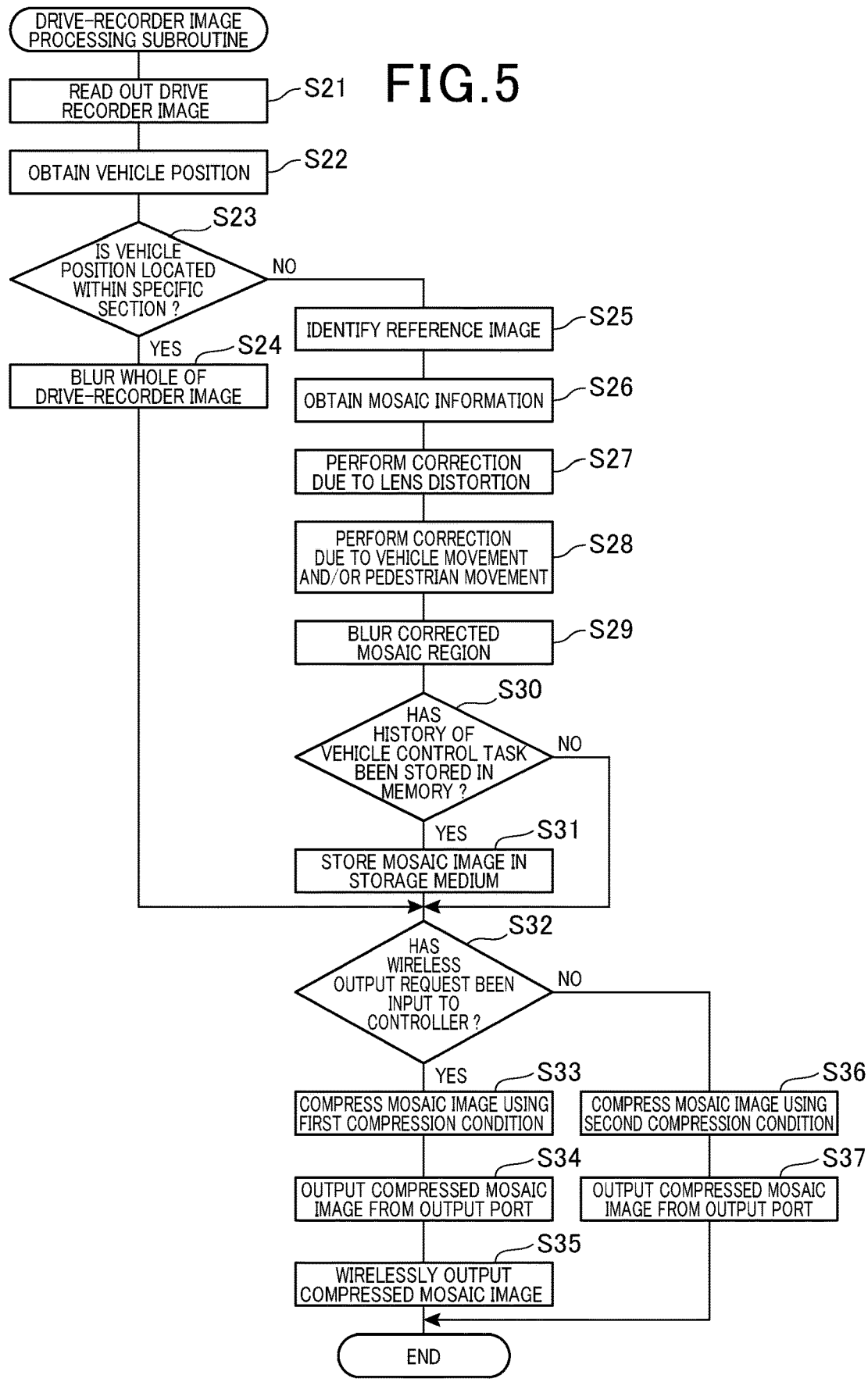
FIG. 5 is a flowchart schematically illustrating an example of a drive-recorder image processing subroutine included in the image processing routine.

The following describes the drive-recorder image processing subroutine in step S10 with reference to FIG. 5.

The following describes the drive-recorder image processing subroutine in step S10 with reference to FIG. 5.

When starting the drive-recorder image processing subroutine, the controller 5 serves as the image readout unit 35 to read out, from the memory 15, the drive recorder image stored in immediately previous step S9 of the current cycle of the image processing routine in step S21.

Next, the controller 5 serves as the vehicle position obtaining unit 37 to obtain a current position, i.e. a current location, of the vehicle 2 using the measurement signal sent from the GPS 55 in step S22. Then, the controller 5 serves as a vehicle position determination unit 39 to determine whether the current position of the vehicle 2 is located in one of previously prepared specific sections whose positional data items are stored in the memory 15 in step S23.

For example, no-imaging or no-photography zones can be used as an example of the previously prepared specific sections.

When it is determined that the current position of the vehicle 2 is located in one of the previously prepared specific sections (YES in step S23), the drive-recorder image processing subroutine proceeds to step S24. Otherwise, when it is determined that the current position of the vehicle 2 is not located in any of the previously prepared specific sections (NO in step S23), the drive-recorder image processing subroutine proceeds to step S25.

In step S24, the controller 5 serves as the mosaic unit 31 to perform a mosaic task or a pixelization task to thereby blur the whole of the drive recorder image, thus generating a whole-mosaic drive recorder image having a lower resolution.

Note that, as described above, the mosaic task to be applied to a target region includes a task of blurring, i.e. pixelating (mosaicing), a target area to thereby, for example, mask or obscure the target area.

Note that a predetermined first encryption key is a unique or non-unique data item having a predetermined bit length previously defined for the mosaic task performed by the mosaic unit 31 in step S24. Specifically, inputting, to the controller 5, the first encryption key using an unillustrated device enables the mosaic unit 31 or a normal computer to decode the whole-mosaic drive recorder image into the original drive recorder image. The first encryption key for the mosaic task carried out by the mosaic unit 31 in step S24 or information that can obtain the first encryption key is stored in the memory 15. After completion of the operation in step S24, the drive-recorder image processing subroutine proceeds to step S31.

Otherwise, in step S25, the controller 5 serves as the mosaic unit 31 to extract, i.e. read out, one of the recognition images as a reference image; the recognition images have been stored in the memory 15, and the reference image is the most recently generated recognition image in the recognition images stored in the memory 15.

That is, the mosaic unit 31 identifies the reference image in the recognition images stored in the memory 15.

Subsequently, the controller 5 serves as the mosaic unit 31 to read out, from the memory 15, the mosaic information correlating with the reference image in step S26. Thereafter, the controller 5 serves as the mosaic unit 31 to correct the position and size of the mosaic region defined by the mosaic information read out in step S26 in step S27.

The following describes how the mosaic unit 31 corrects the position and size of the mosaic region.

Figure 7:
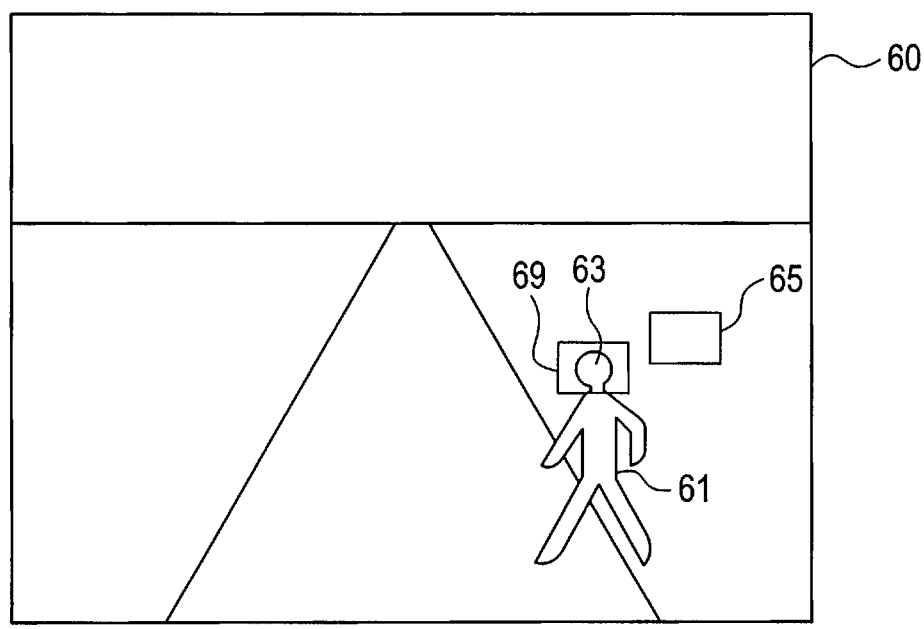
FIG. 7 is a view schematically illustrating an example of a drive recorder image according to the exemplary embodiment.

The position and size of the mosaic region defined by the mosaic information are calculated based on the recognition image whose distortion due to the lens distortion has been corrected. In contrast, no correction for a distortion contained in the drive recorder image due to the lens distortion has been carried out. As illustrated in FIG. 7, if the position and size of the mosaic region (see reference numeral 65) were applied to the drive recorder image (see reference numeral 60), there would be a large deviation between the face region 63 of a recognized pedestrian and the mosaic region 65.

In contrast, as illustrated in FIG. 7, the mosaic unit 31 according to the exemplary embodiment corrects the mosaic region 65 in the drive recorder image 60 in accordance with the distortion correction information, which represents information about the lens distortion of the lens system 3b stored in the memory 15 in step S27. This enables the position and size of the mosaic region 65 to be corrected to substantially match with the face region 63 of the recognized pedestrian. In other words, this enables the mosaic region 65 to mask or cover the face region 63 of the recognized pedestrian.

Following the operation in step S27, the controller 5 serves as the mosaic unit 31 to further correct the position and size of the mosaic region in accordance with movement of the vehicle 2 in step S28.

If the vehicle 2 is travelling, the position of the vehicle 2 at which the drive recorder image was generated in step S9 is different by a travel distance (see reference character D) from the position of the vehicle 2 at which the reference image was identified in step S25. If the position and size of the mosaic region corrected in step S27 were applied to the drive recorder image, there would be a large deviation between the face region of the recognized pedestrian and the mosaic region in the drive recorder image.

From this viewpoint, the mosaic unit 31 reads out, from the memory 15, the date and time at which the drive recorder image was generated, and the date and time at which the reference image was generated in step S28. Then, the mosaic unit 31 calculates a time difference $\Delta T$ between the date and time at which the drive recorder image was generated and the date and time at which the reference image was identified in step S28.

Note that the controller 5 can be programmed to perform one of the operations in steps S27 and S28.

Next, in step S28, the mosaic unit 31 reads out a value of the vehicle speed V at which the reference image was identified, and multiplies the time difference $\Delta T$ by the readout value of the vehicle speed V to thereby calculate the travel distance D. Then, the mosaic unit 31 further corrects the mosaic region corrected in step S27 in the drive recorder image in accordance with the calculated travel distance D such that the further corrected mosaic region substantially matches with the face region of the recognized pedestrian.

Additionally, if the recognized pedestrian is moving, the position of the pedestrian at which the drive recorder image was generated in step S9 is different by a movement distance from the position of the pedestrian at which the reference image was identified in step S25. If the position and size of the mosaic region corrected in step S27 were applied to the drive recorder image, there would be a large deviation between the face region of the recognized pedestrian and the mosaic region in the drive recorder image.

From this viewpoint, the mosaic unit 31 can read out, from the memory 15, the date and time at which the drive recorder image was generated, and the date and time at which the reference image was generated in step S28. Then, the mosaic unit 31 can calculate a time difference $\Delta T1$ between the date and time at which the drive recorder image was generated and the date and time at which the reference image was identified in step S28.

Next, in step S28, the mosaic unit 31 can calculate, based on, for example, a positional difference of the pedestrian between the captured images, a value of a moving speed of the pedestrian at which the reference image was identified, and can multiply the time difference $\Delta T1$ by the calculated value of the movement speed of the pedestrian to thereby calculate the movement distance. Then, the mosaic unit 31 can further correct the mosaic region corrected in step S27 in the drive recorder image in accordance with the calculated travel distance such that the further corrected mosaic region substantially matches with the face region of the recognized pedestrian.

Note that the controller 5 can be programmed to perform one of the operations in steps S27 and S28.

Next, the controller 5 serves as the mosaic unit 31 to perform a mosaic task or a pixelization task to thereby blur the mosaic region of the drive recorder image corrected in each of the operations in steps S27 and S28, thus generating a partial-mosaic drive recorder image having a lower resolution of each pixel of the mosaic region thereof in step S29. Note that a predetermined second encryption key is a unique or non-unique data item having a predetermined bit length previously defined for the mosaic task performed by the mosaic unit 31 in step S29. Specifically, inputting, to the controller 5, the second encryption key using the unillustrated device enables the mosaic unit 31 or a normal computer to decode the partial-mosaic drive recorder image into the original drive recorder image. The second encryption key for the mosaic task carried out by the mosaic unit 31 in step S29 or information that can obtain the second encryption is stored in the memory 15. After completion of the operation in step S29, the drive-recorder image processing subroutine proceeds to step S30.

In step S30, the controller 5 serves as the image storage unit 41 to determine whether the history of the outputting of the vehicle control signal has been stored in the memory 15 to correlate with the reference image identified in step S25. When it is determined that the history of the outputting of the vehicle control signal has been stored in the memory 15 to correlate with the reference image identified in step S25 (YES in step S30), the drive-recorder image processing subroutine proceeds to step S31. Otherwise, when it is determined that the history of the outputting of the vehicle control signal has not been stored in the memory 15 to correlate with the reference image identified in step S25 (NO in step S30), the drive-recorder image processing subroutine proceeds to step S32.

In step S31, the controller 5 serves as the image storage unit 41 to store the partial-mosaic drive recorder image, to which the mosaic task has been applied in step S29, in the memory 15; the partial-mosaic drive recorder image has been generated immediately after identification of the reference image used for controlling the vehicle 2.

Next, the controller 5 serves as the output unit 43 to determine whether a wireless output request has been input thereto by radio in step S32. For example, the storage device 8 is capable of outputting a wireless output request by radio to the vehicular camera 1.

When it is determined that the wireless output request has been input to the controller 5 (YES in step S32), the drive-recorder image processing subroutine proceeds to step S33. Otherwise, when it is determined that the wireless output request has not been input to the controller 5 (NO in step S32), the drive-recorder image processing subroutine proceeds to step S33.

In step S33, the controller 5 serves as the image compression unit 45 to compress at least one of the whole-mosaic drive recorder image and the partial-mosaic drive recorder image by a predetermined first compression condition including a predetermined first compression ratio.

Then, the controller 5 serves as the output unit 43 to output the compressed at least one of the whole-mosaic drive recorder image and the partial-mosaic drive recorder image to the recorder 49 via the output port 11 in step S34, thus storing the compressed at least one of the whole-mosaic drive recorder image and the partial-mosaic drive recorder image in the recorder 49.

After or parallel to the operation in step S34, the controller 5 serves as the output unit 43 to wirelessly output the compressed at least one of the whole-mosaic drive recorder image and the partial-mosaic drive recorder image to the storage device 8 via the radio communication device 7 in step S35, thus storing the compressed at least one of the whole-mosaic drive recorder image and the partial-mosaic drive recorder image in the storage device 8.

Otherwise, in step S36, the controller 5 serves as the image compression unit 45 to compress at least one of the whole-mosaic drive recorder image and the partial-mosaic drive recorder image by a predetermined second compression condition including a predetermined second compression ratio.

Then, the controller 5 serves as the output unit 43 to output the compressed at least one of the whole-mosaic drive recorder image and the partial-mosaic drive recorder image to the recorder 49 via the output port 11 in step S37, thus storing the compressed at least one of the whole-mosaic drive recorder image and the partial-mosaic drive recorder image in the recorder 49.

The vehicular camera 1 of the exemplary embodiment is configured to generate a drive recorder image, and output the drive recorder image, and also configured to perform, based on a recognition image, at least one of the vehicle control tasks. This configuration of the vehicular camera 1 eliminates the need to install a drive recorder camera in the vehicle 2 in addition to the vehicular camera 1, making it possible to save an installable space in the vehicle 2.

The vehicular camera 1 is also configured to perform the mosaic task to thereby blur, in the drive recorder image, a predetermined region where the face of at least one recognized pedestrian. This configuration masks the predetermined region, thus protecting the privacy of the at least one recognized pedestrian.

The vehicular camera 1 is further configured to

1. Correct a distortion of a recognition image due to a lens distortion

2. Identify, in the corrected recognition image, a face region containing the face of the at least one recognized pedestrian 3. Obtain a drive recorder image to which no correction for the lens distortion has been applied 4. Correct the position and size of the mosaic region in the drive recorder image in accordance with the distortion correction information, which represents information about the lens distortion of the lens system 3b This configuration therefore enables the mosaic region to match with the face region of the at least one recognized pedestrian with higher accuracy.

Inputting, to the controller 5, the first encryption key enables the mosaic unit 31 to decode the whole-mosaic drive recorder image to be decoded into an original drive recorder image. Similarly, inputting, to the controller 5, the second encryption key enables the mosaic unit 31 to decode the partial-mosaic drive recorder image to be decoded into an original drive recorder image. This enables a user, who has at least one of the first and second encryption key, to obtain the original drive recorder image with no mosaic regions. In contrast, this disables a user, who fails to have the first and second encryption keys, from obtaining the original drive recorder image.

Additionally, the vehicular camera 1 is configured to calculate the pitch quantity of the vehicle 2, and determine the position of the mosaic region in the recognition image based on the pitch quantity of the vehicle 2. This configuration enables the mosaic region to substantially match with the face region of the at least one recognized pedestrian even if the vehicle 2 pitches upward or downward by the pitch quantity about the pitch axis.

The vehicular camera 1 is configured to obtain the current position of the vehicle 2, and determine whether the current position of the vehicle 2 is located within one of the previously prepared specific sections. The vehicular camera 1 is configured to perform the mosaic task or pixelization task upon it being determined that the current position of the vehicle 2 is located within one of the previously prepared specific sections. This configuration enables the privacy of at least one object located within one of the specific regions to be protected.

The vehicular camera 1 mounted to the vehicle 2 is configured to store, in the storage unit 9, a drive recorder image that has been generated immediately after identification of the reference image. This configuration enables the drive recorder image showing the front view to be stored in the storage medium 9.

The vehicular camera 1 is capable of wirelessly outputting a generated drive recorder image to the outside of the vehicle 2. This enables the drive-recorder image to be easily stored.

The vehicular camera 1 is configured such that the output port 11 for outputting drive recorder images therefrom uses any one of a USB interface, LVDS interface, or Ethernet interface. This configuration therefore enables the vehicular camera 1 to be easily connected to other devices installed in the vehicle 2 via the vehicular network.

Modifications

Figure 8:
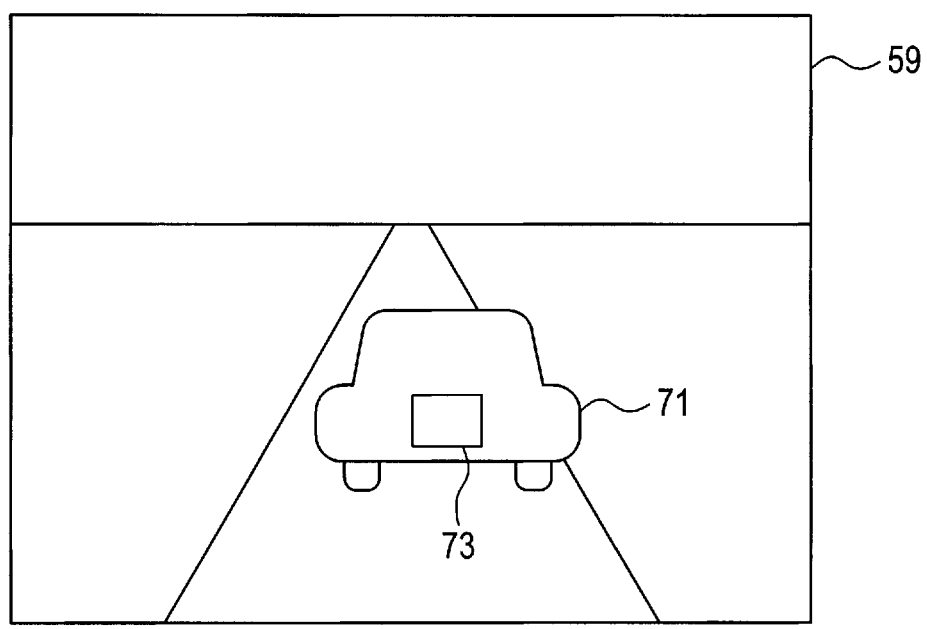
FIG. 8 is a view schematically illustrating another example of the recognition image in which a preceding vehicle is included according to the exemplary embodiment.

The first embodiment of the present disclosure has been described before, but the present disclosure is not limited thereto. Specifically, the object recognition unit 27 can recognize, in the acquired recognition image, at least one target object except for pedestrians to be recognized in accordance with the known image recognition technologies in step S12. For example, the object recognition unit 27 can be configured to recognize a preceding vehicle 73 other than the vehicle 2 in the recognition image 59 (see FIG. 8).

When the object recognition unit 27 recognizes the preceding vehicle 73 other than the vehicle 2, the region identification unit 29 can for example recognize a region 73 of the license plate of the preceding vehicle 73 in step S13; the region 73 of the license plate represents an example of the specific region in the recognition image. In addition, the mosaic unit 31 can correct, in the recognition image, the position of the region 73 of the license plate based on the pitch quantity read out in step S14 in step S15. Thereafter, the mosaic unit 31 can perform the mosaic task or pixelization task to thereby blur the region 73 of the license plate in the drive recorder image, thus generating a partial-mosaic drive recorder image.

The recorder 49 can be installed in the vehicular camera 1.

The vehicular camera 1 can be configured to store the whole-mosaic drive recorder image or the partial-mosaic drive recorder image in the storage medium 9.

The image storage unit 23 can store the recognition image one of the memory 15 and a storage memory other than the memory 15, and also can store the drive-recorder image in the other of the memory 15 and the storage memory.

As illustrated by phantom lines in FIG. 1, the vehicular camera 1 can include a card slot CS into which a memory card MC can be inserted. While the memory card MC is inserted in the card slot CS, the memory card MC can be electrically connected to the controller 5. This enables the controller 5 to record a drive recorder image in the memory card MC.

The vehicular camera 1 can be configured to capture an image of another directional view from the vehicle 2, such as a rear view, a right side view, or a left side view from the vehicle 2.

The functions of one element in the exemplary embodiment can be distributed as plural elements, and a function of one element in the exemplary embodiment can be implemented by plural elements. The functions that plural elements have can be implemented by one element, and one function carried out by plural elements can be implemented by one element. At least part of the structure of the embodiment can be replaced with a known structure having the same function as the at least part of the structure of the corresponding embodiment. A part of the structure of the above embodiment can be eliminated. At least part of the structure of the above embodiment can be added to or replaced with the structure of one of the modifications. All aspects included in the technological ideas specified by the language employed by the claims constitute embodiments of the present disclosure.

The present disclosure can be implemented by various embodiments; the various embodiments include systems each including the vehicular camera 1, programs for serving a computer as the controller 5 of the vehicular camera 1, a nonvoluntary storage medium, such as a semiconductor memory, in which the programs are stored. The present disclosure can be implemented by image generation methods, cruise control methods, and/or mosaic processing methods.

The invention claimed is:

1. A vehicular camera comprising:
an image generation unit configured to generate at least one image of a directional view from a vehicle;
an object recognition unit configured to recognize a target object in the at least one image;
a region identification unit configured to identify, in the at least one image, a specific region in the target object recognized by the object recognition unit;
a vehicle control unit configured to perform a vehicle control task based on the recognized target object; and
a mosaic unit configured to:
identify a specific region in the at least one image corresponding to the specific region in the target object; and
perform a mosaic task to thereby blur a mosaic region in the at least one image, the mosaic region including at least the specific region in the target object.

2. The vehicular camera according to claim 1, wherein:
the mosaic unit is configured to:
set the mosaic region in the at least one image in accordance with information about the specific region in the at least one image;
correct at least one of a position and size of the mosaic region such that the mosaic region masks the specific region in the at least one image; and
perform the mosaic task to thereby blur the mosaic region masking the specific region in the at least one image.

3. The vehicular camera according to claim 1, wherein:
the image generation unit is configured to generate the at least one image based on incident light via an optical system,
the vehicular camera further comprising:
an image correction unit configured to perform correction for the at least one image to thereby reduce a distortion of the at least one image due to a distortion of the optical system,
and wherein:
the object recognition unit is configured to recognize the target object in the at least one image that has been corrected by the image correction unit; and
the mosaic unit is configured to correct at least one of a position and size of the mosaic region in the at least one image in accordance with information about the correction performed by the image correction unit.

4. The vehicular camera according to claim 1, wherein:
the target object recognized by the object recognition unit is a pedestrian; and
the specific region in each of the at least one image represents a region of a face of the pedestrian.

5. The vehicular camera according to claim 1, wherein:
the target object recognized by the object recognition unit is a target vehicle other than the vehicle; and
the specific region in the at least one image represents a region of a license plate of the target vehicle.

6. The vehicular camera according to claim 1, wherein:
the mosaic unit is configured to perform the mosaic task to thereby generate at least one mosaic image whose mosaic region has been blurred; and
the at least one mosaic image is configured to be decodable based on key information previously defined for the mosaic task.

7. The vehicular camera according to claim 1, further comprising:
a pitching calculation unit configured to calculate a pitch quantity of the vehicle at a timing when the at least one image is generated by the image generation unit,
wherein:
the mosaic unit is configured to correct at least one of a position and size of the mosaic region in the at least one image in accordance with the pitch quantity.

8. The vehicular camera according to claim 1, further comprising:
a vehicle position obtaining unit configured to obtain a position of the vehicle; and
a vehicle position determination unit configured to determine whether the position of the vehicle is located within a predetermined specific section,
wherein:
the mosaic unit is configured to perform the mosaic task to thereby blur the mosaic region in the at least one image when it is determined that the position of the vehicle is located within a predetermined specific section, the mosaic region being set to a whole of the at least one image.

9. The vehicular camera according to claim 1, wherein:
the at least one image comprises a first image and a second image;
the target object is used by the by the vehicle control unit for performing the vehicle control task; and
the second image, whose mosaic region has been blurred, is generated by the image generation unit immediately after the first image used by the vehicle control unit for performing the vehicle control task.

10. The vehicular camera according to claim 1, wherein:
the mosaic unit is configured to store the at least one image with the mosaic region in a storage medium.

11. The vehicular camera according to claim 1, further comprising:
an output unit configured to externally output the at least one image with the mosaic region.

12. The vehicular camera according to claim 11, wherein:
the output unit is configured to wirelessly output the at least one image with the mosaic region to an external device.

13. The vehicular camera according to claim 11, wherein:
the output unit is configured to output, through an output port, the at least one image with the mosaic region to an external device, the output port having one of a Universal Serial Bus interface or a low voltage differential signaling interface.

14. A vehicular camera comprising:
an imaging unit installed in a vehicle;
a housing configured to house the imaging unit such that the imaging unit is capable of capturing at least one image of a directional view from the vehicle;
an output port mounted to the housing and communicably connected to an external device; and
a processor mounted in the housing and communicable with a memory storing a program, the processor being configured to perform, in accordance with the program, the following instructions:
a first instruction that recognizes a target object in the at least one image;
a second instruction that identifies, in the at least one image, a specific region of the target object;
a third instruction that identifies a specific region in the at least one image corresponding to the specific region in the target object;
a fourth instruction that performs a mosaic task to thereby blur a mosaic region in the at least one image, the mosaic region including at least the specific region in the target object; and
a fifth instruction that externally outputs the at least one image with the mosaic region via the output port mounted to the housing.

* * * * *